United States Patent [19]

Chamberlain

[11] Patent Number: 4,724,862

[45] Date of Patent: Feb. 16, 1988

[54] DRAIN VALVE

[76] Inventor: Don N. Chamberlain, 553 Rivercrest Dr., Woodstock, Ga. 30188

[21] Appl. No.: 924,526

[22] Filed: Oct. 29, 1986

[51] Int. Cl.[4] .............................................. F16K 25/00
[52] U.S. Cl. .................................. 137/203; 251/361; 251/364
[58] Field of Search ................ 137/204, 203; 251/364, 251/361

[56]  References Cited

U.S. PATENT DOCUMENTS

| | | | |
|---|---|---|---|
| 891,808 | 6/1908 | Adams | 137/204 X |
| 2,014,759 | 9/1935 | Clay | 251/361 X |
| 3,107,692 | 10/1963 | Forwald | 251/63 X |
| 3,444,892 | 5/1969 | Doyle | 251/364 X |
| 4,030,517 | 6/1977 | Pyle | 137/203 |
| 4,336,821 | 6/1982 | Frantz | 137/204 X |
| 4,353,387 | 10/1982 | Boruygues | 137/204 X |

*Primary Examiner*—Alan Cohan
*Attorney, Agent, or Firm*—Jones, Askew & Lunsford

[57] ABSTRACT

There is disclosed an automatic drain valve which consists of a control block with a central bore and a coaxial inlet bore. The central bore and the inlet bore are divided from each other by a seal which is seated in the inlet bore and held in place by a threaded fitting. An outlet bore communicates with the central bore at a position displaced from the seal, and a gauge bore intersects and communicates with the central bore at a position between the inlet bore seal and the outlet bore. The seal has an opening with a beveled edge that matches the beveled leading edge on a valve stem which is slidably mounted within the central bore and operated by means of pneumatic cylinder which is in turned controlled by solenoid operated either by a conventional timer or by a humidity sensor. The seal is placed out of the direct line of flow of the water and air being drained and the valve stem is closed at high velocity in order to minimize the wear on the round seal and extend the life of the drain valve. A gauge is mounted on the gauge bore in order to monitor both leakage of the drain valve and any plugging of the outlet piping from the drain valve.

5 Claims, 5 Drawing Figures

DRAIN VALVE

BACKGROUND OF THE INVENTION

This invention relates generally to drain or blow down valves for compressed air systems to remove condensed water therefrom, and more particularly concerns an automatic drain valve that at predetermined intervals opens and closes to drain water from a compressed air system.

As ambient air is compressed by a compressor in a compressed air system, the reduced volume of the air causes the water vapor in the air to condense and collect at low-lying points in the compressed air system. If the compressed air system is used to power tools or other delicate equipment, it is necessary that the compressed air be supplied to those tools free of excess condensed moisture. Consequently, it is necessary to remove the condensed water from the low-lying areas in the compressed air system.

The water can be removed from the compressed air system by providing drain valves at the low points in the system which valves can be periodically opened allowing the compressed air to force the water out through the drain valve. Conventionally, such automatic drain or blow down valves are of the rotating ball valve type. The ball valve consists of a spherical chamber positioned between the valve inlet and its outlet. A ball is rotatably mounted in the spherical chamber with a hole drilled through the ball. The ball valve is opened by rotating the ball so that the hole in the ball lines up with the inlet and outlet of the spherical chamber. In order to close the ball valve, a solenoid or motor rotates the ball so that the hole through the ball is at 90 degrees to the direction of the inlet and outlet ports. As the ball in a conventional ball valves rotates toward its closed position, the opening through the ball valve gradually becomes smaller as the hole drilled through the ball engages and is restricted by the edges of the inlet port. As the opening through the ball valve becomes smaller and smaller, the velocity of the water escaping under constant pressure through the restricted opening in the ball valve increases so that substantial erosion of the ball adjacent its hole occurs during the opening and closing of the ball valve. Consequently, such ball valves conventionally have to be replaced every three to six months.

In addition, the water to be drained from a compressed air system may include contaminants which, in addition to speeding the erosion of the ball valve, may also deposit on the outlet port of the drain valve and plug the outlet port. If the outlet port becomes plugged or restricted, it is apparent that the drain valve will not serve its intended purpose. Heretofore, the only way of determining whether a ball valve was working properly was to take it apart for inspection.

SUMMARY OF THE INVENTION

It is therefore an object to the present invention to provide an automatic drain valve which will provide substantially more operations that the conventional rotating ball valve.

It is likewise an object to the present invention to provide an automatic drain valve which will close quickly to minimize the amount of erosion on the valve sealing components and thereby extend the life of the valve.

It is an also object to the present invention to provide a sealing arrangement for the valve which will be self-aligning and will provide a positive seal when the valve is closed.

It is an auxiliary object to the present invention to provide an automatic drain valve having an indicator which will provide maintenance personnel a visual indication of leakage of the valve and/or plugging of the valve.

The foregoing objects of the present invention are achieved by an automatic drain valve that has a control block with a central bore and a coaxial inlet bore. The central bore has a valve stem slidably mounted in it which valve stem engages a round seal which is seated in the coaxial inlet bore in order to close the inlet bore. Particularly, the seal has an opening with an edge having a 45 degree bevel, and the valve stem has a matching 45 degree bevel at its leading edge for engaging the seal. The valve stem is driven by a compressed air cylinder and piston which drive the valve stem toward the seal at a velocity greater than 1.25 inch per second in order to quickly shut off the valve thereby minimizing any erosion that might occur as a result of contaminant and abrasives in the water being drained. The seal is mounted in the inlet bore and held in place by a fitting which is threaded into the inlet bore. The seal can simply be replaced by removing the inlet fitting and sliding the seal out of the inlet bore. In addition, the inner diameter of the fitting is less than the inner diameter of the seal so that the seal is not in the direct path of water flowing through the inlet fitting and wear on the seal will thereby be minimized during operation of the valve. Finally, there is provided a pressure gauge connected to the central bore adjacent the seal which provides a visual indication of whether the valve is leaking when it is closed or whether the outlet is plugged when the valve is opened.

Other objects and advantages of the invention will become apparent upon reading the following detailed description and upon reference to the drawings.

BRIEF DESCRIPTION OF THE DRAWINGS

FIG. 5 is a section view showing the solenoid control which open and closes the drain valve of the present invention.

DETAILED DESCRIPTION OF THE INVENTION

While the invention will be described in connection with a preferred embodiment, it will understood that I do not intend to limit the invention to that embodiment. On the contrary, I intend to cover all alternatives, modifications, and equivalents as may be included within the spirit and scope of the invention as defined by the appended claims.

Figure 1:
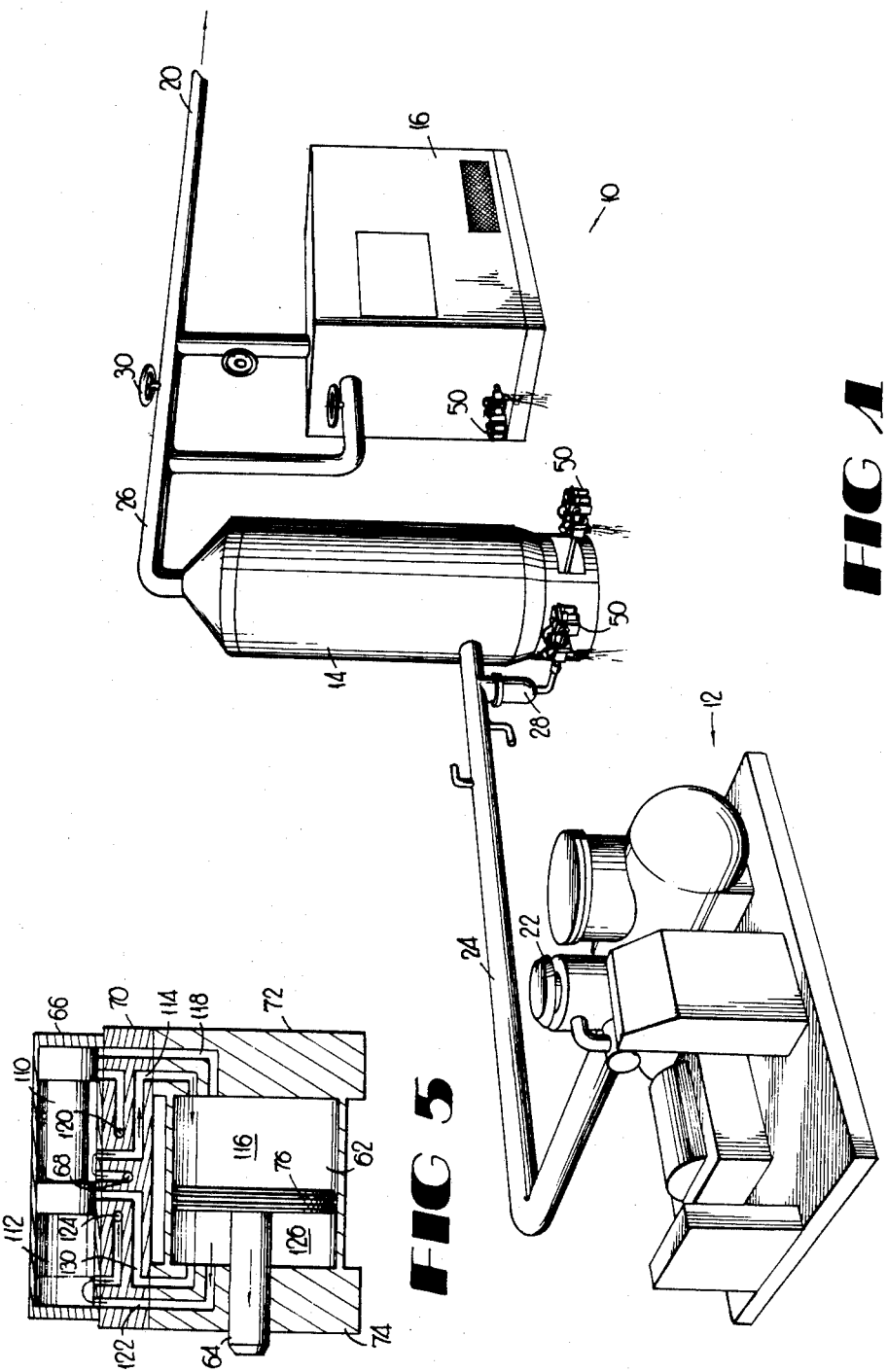
FIG. 1 is a prospective diagram showing a conventional compressed air system on which drain valves of the present invention are useful.

Turning to FIG. 1, there is shown a conventional compressed air system 10 consisting of an air compressor 12, a receiver tank 14, and an air dryer 16. The compressed air system 10 supplies compressed air to a facility (not shown) by means of a delivery pipe 20. The compressed air in delivery pipe 20 can be used to power pneumatic tools and other pneumatic equipment. In order for the compressed air in delivery pipe 20 to be used to power pneumatic equipment, it is necessary that the compressed air be clean and dry.

In operation, ambient air is pulled into compressor 12 through intake 22. The compressor 12 compresses the air and delivers it through pipe 24 into the receiver tank 14. As the ambient air is compressed by the compressor 12, the dew point of the compressed air is lowered until it approaches and drops below ambient temperature. Once the dew point drops below ambient temperature, the water vapor in the air condenses on the internal surfaces of the pipe 24, the receiver tank 14, piping 26, and air dryer 16. In order to assure that the air delivered through delivery pipe 20 is clean and dry, the air dryer 16 is connected into the compressed air system so that all of the compressed air circulates through it when bypass valve 30 is closed. The air dryer 16 is a dehumidifier which is used to remove any remaining water vapor from the compressed air.

As the compressor 12 continues supplying compressed air to the system, the water which has condensed in the system collects at low points in the system such as sediment bulb 28, receiver tank 14, and air dryer 16. To ensure continuing delivery of dry air via delivery pipe 20, it is necessary to remove the condensed water at those low points by means of a drain valve.

In accordance with the present invention, automatic drain valves 50 are provided at those water collection points to drain or to blow down the collected water from the system. The automatic drain valves 50 at predetermined intervals, measured by time or measured by humidity in the system, automatically open to drain the collected water from the low points in the system and remain open for a predetermined short period of time before closing. The compressed air in the system serves to force the water out of the opened drain valves 50 into a suitable external drain system.

Figure 2:
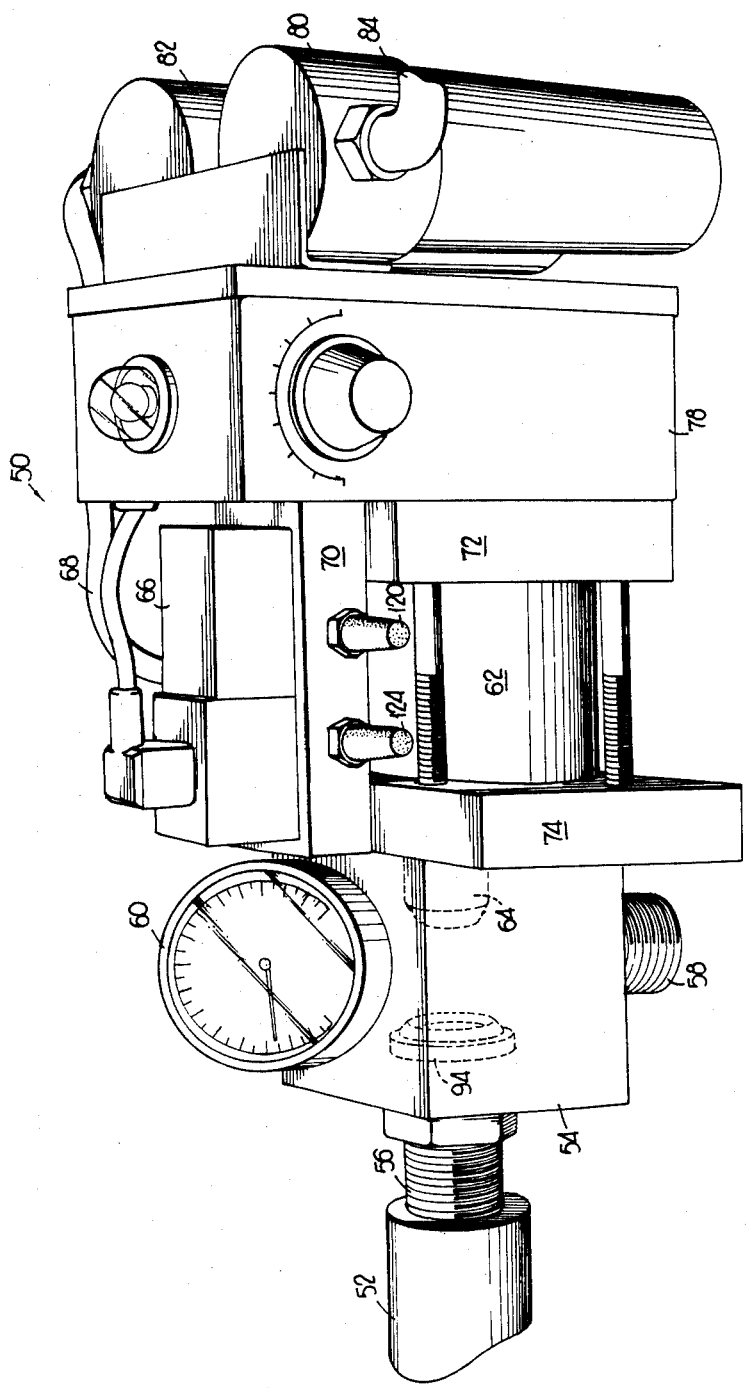
FIG. 2 is a prospective view of the drain valve of the present invention.

Turning to FIG. 2, there is shown the automatic drain valve 50 of the present invention which is connected by means of a pipe 52 to the compressed air system where water collects. The automatic drain valve 50 consists of a control block 54 with an inlet fitting 56 and an outlet fitting 58. A pressure gauge 60 is connected to the control block for reasons which will be described in greater detail below. The control block 54 is connected to a pneumatic cylinder 62 which serves to operate a valve stem 64 within the control block. The pneumatic cylinder is operated by means of a spool valve solenoid 66 which diverts compressed air in a feed pipe 68 through a diverting block 70 which directs the air flow from the pipe 68 to either end of the cylinder 62 through end blocks 72 and 74 in order to drive the piston 76 (FIG. 5) to control the valve stem 64. The solenoid 66 is controlled by a conventional timer circuit 78, which may be set to operate the solenoid at any preselected time interval and adjusted to provide any preselected interval during which the drain valve is open. Air filters 80 and 82 are provided to assure that the compressed air from the system received at connector 84 is free of contaminants before it is fed through feed line 68 to the solenoid 66.

In the preferred embodiment, the solenoid 66 as previously indicated is controlled by an automatic electronic timer circuit 78 which may be constructed in accordance with well known and conventional practice to provide an off time (valve closed) and on time (valve open) so that the automatic drain valve drains the system as frequently or infrequently as necessary and assures that a minimum amount of compressed air is released from the system after the water collected in the system has been drained. It is also contemplated in connection with the present invention that the automatic drain valve may be controlled by control circuitry 78 which, instead of being governed by a timer, would be connected to a sensor in the receiver tank, for example, which sensor senses the relative of humidity within the tank and operates the automatic drain valve in response to a predetermined level of relative humidity. The control circuitry, whether time controlled or relative humidity controlled, is believed conventional in design, and therefore no further description is thought necessary.

Figure 3:
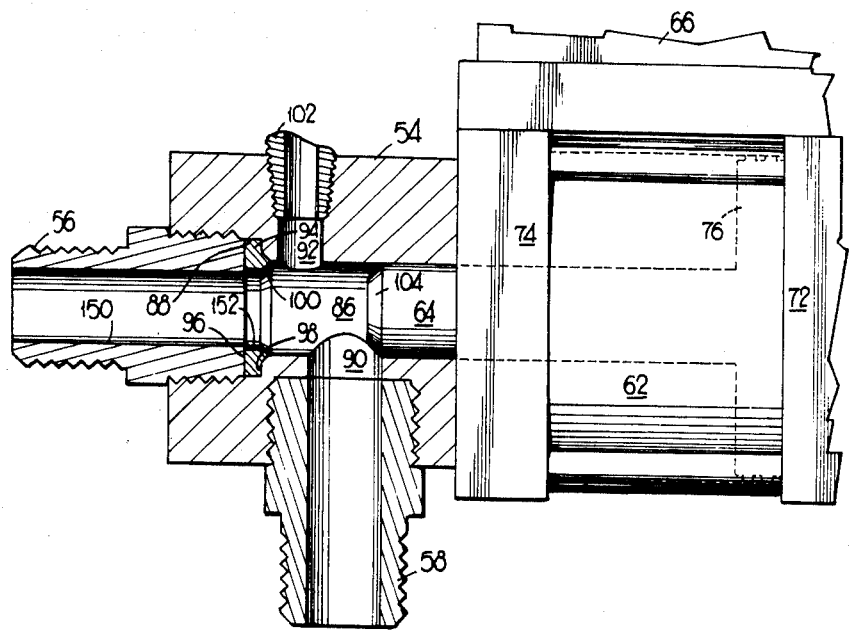
FIG. 3 is a section view of the control block of the drain valve of the present invention showing the valve in its open condition.

Turning to FIG. 3 there is shown a cutaway section view of the control block 54. The control block 54 has a central bore 86, an inlet bore 88, an outlet bore 90, and a gauge bore 92. The inlet bore 88 is coaxial with and extends from the central bore 86. A round teflon seal 94 is seating in the inlet bore at the end of the inlet bore where it joins the central bore. The teflon seal 94 is held in place by means of the fitting 56 which is threaded into the inlet bore 88 and bears against the flat surface 96 of the seal 94 which in turn causes in seal 94 to seat against the end 98 of the inlet bore. The seal 72 and 74 of the pneumatic cylinder 62. The solenoid 66 includes a spool 110 which shuttles back and forth within a solenoid bore 112 at the urging of a magnetic winding (not shown). With the spool 110 in the position shown in FIG. 5, compressed air provided through feed line 68 is connected by the spool to feed line 114 for chamber 116 of cylinder 62. Exhaust line 118 of chamber 116 is closed off by the spool 110 so that air cannot escape to exhaust port 120. On the other hand, outlet line 122 of chamber 126 of cylinder 62 is opened through solenoid bore 112 to exhaust port 124 so that the air in chamber 126 of cylinder 62 can be exhausted to the atmosphere as the cylinder moves toward the left. Consequently, compressed air is forced into chamber 116 of the cylinder 62 to force the piston 76 and valve stem 64 toward the left to close the drain valve.

Figure 4:
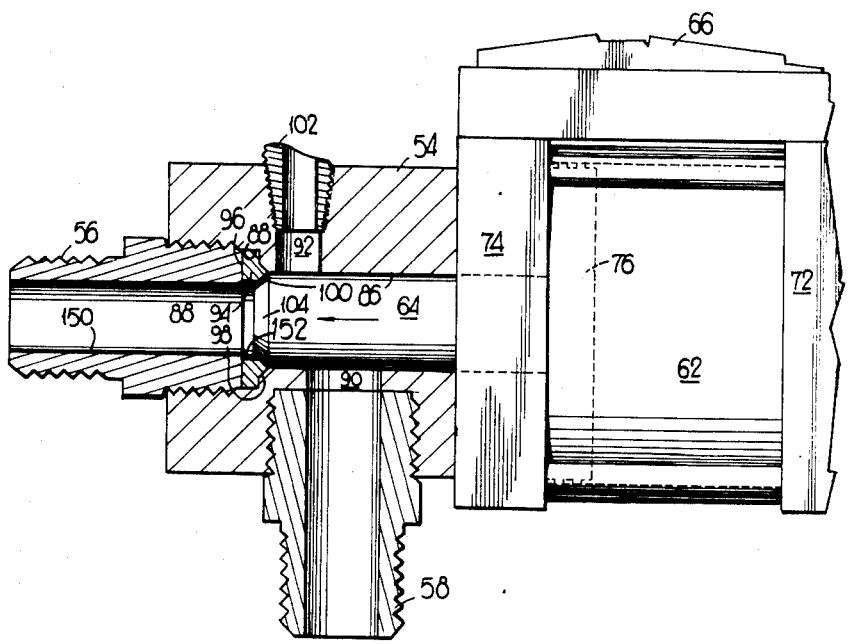
FIG. 4 is a section view of the control block of the drain valve of the present invention showing the valve in its closed condition.

Alternatively, in order to open the drain valve by moving the valve stem 64 to the right in FIG. 4, the spool 110 is moved to the left by the electromechanical action of the solenoid 66. When the spool is moved to the left as shown in phantom in FIG. 5, the compressed air delivered through inlet 68 is connected via feed line 130 to chamber 126 of cylinder 62. The outlet line 122 of chamber 126 is sealed off from the exhaust line 124 by the spool 110. On the other hand, the exhaust line 118 of chamber 116 is open to the exhaust port 120 to allow air in chamber 116 to escape to atmosphere as the piston 176 moves toward the right in FIG. 5. Consequently as compressed air is delivered to chamber 126 of cylinder 62 via feed line 13, the piston 76 is forced toward the right to open the drain valve.

Returning to FIGS. 3 and 4, it can be seen that when the valve stem 64 is in the position shown in FIG. 4, the beveled edge 104 of the valve stem and beveled edge 100 of the seal 94 match and engaged to seal off inlet bore 88 thereby closing the valve. Consequently, the pressure in the central bore 86 will be atmospheric, and the gauge 60 connected to the gauge bore 92 will register zero pressure. If for any reason, air and water are leaking around the valve stem 64 and past the seal 94, back pressure will be created in the central bore 86 which will be communicated through gauge bore 92 to the gauge 60 thereby registering a small pressure. That small pressure when the valve is closed gives a visual indication to maintenance personnel that the valve is leaking and needs to be inspected or repaired.

Alternatively, when the valve stem 64 is retracted, and air and water are being drained through outlet bore 90, there will be virtually no pressure build up in the central bore 86, and the gauge during normal operation the gauge 60 will read zero pressure. If, however, the drain bore 90 or any of the piping connected to outlet 58 becomes plugged, that will result in a back pressure built up in the central bore 86 which will be communicated via gauge bore 92 to the gauge 60 which will indicate that pressure. Again, the pressure on the gauge 60 when the drain valve is opened will give maintenance personnel an indication that the outlet system of the valve is plugged or impeded.

In accordance with one aspect of the present invention, it should be noted that the cylinder 62 and the pressure provided through line 68 is sufficient to drive the valve stem 64 toward the round teflon seal at a fairly high velocity greater than 1.25 inch per second so that the transition period between full open and full closed will be minimized. As a result, very little liquid and air will escape past the two matching beveled edges at high velocity during the closing cycle. Consequently, the wear on the beveled edges will be minimized thus extending the life of the drain valve. In accordance with that same objective, it should be noted that the fitting 56 has a central bore 150 which is slightly smaller in diameter than the opening 152 of the round seal 94. Consequently, as air and water rush at high speed through the bore 150 of fitting 56 into the central bore 86, the air and water do not impact directly on the surface of the round seal 94 thereby minimizing wear on the opening 152 of the round seal 94. Likewise, the beveled edge 100 of the seal 94 is out of the direct path of the air and water rushing into the central bore.

Furthermore, in accordance with the present invention, it should be appreciated that the round seal 94 which is seated in the inlet bore 88 and held in place by means of the threaded fitting 56 is easily removed for replacement by simply removing the fitting 56 and pulling the seal 94 out. Consequently, maintenance of the drain is significantly enhanced over prior automatic drain valves such as the rotating ball valves previously described.

I claim:
1. A drain valve comprising
 (a) a control block with
  (i) a central bore having an axis;
  (ii) an inlet bore, which is coaxial with the central bore and has an inwardly tapered end for receiving a fitting and a round seal which round seal has a matching taper and is seated in the end of the inlet bore to define a demarcation between the inlet bore and the central bore and which round seal has an opening with a beveled opening edge facing the central bore; and
  (iii) an outlet bore communicating with the central bore at a position diplaced from the round seal;
 (b) a valve stem slidably mounted in the central bore and having a beveled leading edge for matching and engaging the beveled opening edge of the round seal to close the inlet bore;
 (c) drive means operable connected to the valve stem to drive the beveled leading edge of the valve stem into engagement with the beveled opening edge of the round seal; and
 (d) control means connected to the drive mean for activating the valve stem to open and close the inlet bore at predetermined intervals.
2. The drain valve of claim 1, wherein the beveled opening edge on the round seal and the beveled leading edge on the valve stem are at 45 degrees to the central bore axis and the tapered end of the inlet bore and the matching taper on the seal are at 45 degrees to the central bore axis.
3. The drain valve of claim 1, wherein the control block further includes a gauge port communication with the central bore and is located along the central bore axis between the round seal and the outlet bore, which gauge port is connected to a gauge for measuring pressure in the central bore.
4. The drain valve of claim 1, wherein the round seal is insertable into the inlet bore and held in its seated position by the fitting and wherein he fitting has an inner diameter and the opening of the seal has an inner diameter such that the inner diameter of the fitting is less than the inner diameter of the opening of the seal.
5. The drain valve of claim 5, wherein the round seal is Teflon and the valve stem is steel.

* * * * *